(12) United States Patent
Courter

(10) Patent No.: US 7,707,769 B1
(45) Date of Patent: May 4, 2010

(54) BOUQUET HOLDING DEVICE

(76) Inventor: Frank Courter, 148 Cedar St., East Hanover, NJ (US) 07936

( * ) Notice: Subject to any disclaimer, the term of this patent is extended or adjusted under 35 U.S.C. 154(b) by 0 days.

(21) Appl. No.: 12/361,342

(22) Filed: Jan. 28, 2009

(51) Int. Cl.
A01G 5/02 (2006.01)
(52) U.S. Cl. .................................. 47/41.12; 47/41.01
(58) Field of Classification Search ............... 47/41.01, 47/39, 41.12, 65, 41.15, 44, 41.13, 45, 46, 47/47, 66.6, 66.1; 206/423; 428/23, 17, 428/24; D11/143, 144, 146, 147; 248/27.8, 248/74.1, 74.2
See application file for complete search history.

(56) References Cited

U.S. PATENT DOCUMENTS

| 65,204 | A | | 5/1867 | Frye | |
|---|---|---|---|---|---|
| 1,775,203 | A | | 9/1930 | Krumholz | |
| 2,553,103 | A | | 5/1951 | Miller | |
| D230,408 | S | * | 2/1974 | Persson-Melin | ........... D11/147 |
| 4,964,237 | A | | 10/1990 | Specht | |
| 5,070,644 | A | | 12/1991 | Hasty | |
| 5,301,463 | A | * | 4/1994 | Domurat | ................... 47/41.01 |
| 5,477,637 | A | * | 12/1995 | Aldrich | ..................... 47/41.01 |
| 5,526,942 | A | * | 6/1996 | Domurat | ..................... 211/60.1 |
| 5,787,638 | A | * | 8/1998 | Harshman | .................. 47/41.12 |
| 5,996,813 | A | | 12/1999 | Hendrix et al. | |
| 6,004,635 | A | * | 12/1999 | Li | ............................... 428/23 |
| 6,038,812 | A | * | 3/2000 | Belokin et al. | ............. 47/41.01 |
| 6,189,261 | B1 | | 2/2001 | Helgeson | |
| 6,457,276 | B1 | * | 10/2002 | Masters | ..................... 47/41.01 |
| 6,561,471 | B1 | * | 5/2003 | Hawie | ........................ 248/201 |
| D526,595 | S | | 8/2006 | Taddeo et al. | |
| 7,213,365 | B2 | | 5/2007 | Van Zuylen | |
| 7,310,909 | B2 | * | 12/2007 | Broel et al. | ................... 47/41.1 |
| 2005/0091917 | A1 | * | 5/2005 | Brennan | ..................... 47/41.01 |
| 2008/0245933 | A1 | * | 10/2008 | Stokes | ........................ 248/74.1 |
| 2009/0266945 | A1 | * | 10/2009 | Dietrich et al. | ............. 248/74.2 |

* cited by examiner

Primary Examiner—T. Nguyen
(74) Attorney, Agent, or Firm—Kyle Fletcher

(57) ABSTRACT

The bouquet holding device includes an outer ring, a plurality of inner rings, a door attached via hinge to the outer ring, a locking clasp, and a track. The track runs along the interior periphery of both the door and the outer ring, and engages a grooved notch located on each end of each inner ring. The hinged door locks in place with respect to the outer ring to ensure that the inner rings are enclosed within the track. The inner rings are capable of rotating freely about the outer ring. The inner rings are capable of securing a single or a plurality of flowers or objects associated with the bouquet.

8 Claims, 3 Drawing Sheets

BOUQUET HOLDING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of flower bouquets, more specifically, a device for holding a bouquet of flowers.

B. Discussion of the Prior Art

As a preliminary note, it should be stated that there is an ample amount of prior art that deals with bouquet holding apparatuses. As will be discussed immediately below, no prior art discloses a bouquet holding apparatus that involves a plurality of inner rings that can rotate about the interior of a larger ring, and of which the inner rings can support an individual or a plurality of flowers or items included within the bouquet.

The Specht Patent (U.S. Pat. No. 4,964,237) discloses a device for assembling elaborate bouquets including a workholder and support means for supporting the workholder in a cantilever fashion. However, the device is not suited for supporting a flower bouquet in a vase or watering container without being obstructive or otherwise in view of the watering container.

The Miller Patent (U.S. Pat. No. 2,553,103) discloses a standard for preparing hand bouquets. However, the device is directed to hand bouquets and a stand that supports said hand bouquets in a position analogous to when said bouquet is being carried by hand and not a bouquet holding device having an outer ring surrounding a plurality of inner rings that can rotate about the inner circumference of the outer ring in order to enable various flowers or objects of the bouquet to rotate freely.

The Hnedrix at al. Patent (U.S. Pat. No. 5,996,813) discloses a flower arrangement stand with multiple work station blocks for maintaining pew and bouquet holders stable while making up flower arrangements using the holders. However, the stand is suited for use while creating the floral arrangement, and not in addition to supporting the bouquet while in a vase or watering container.

The Van Zuylen Patent (U.S. Pat. No. 7,213,365) discloses a device for arranging a bunch of flowers, in particular, a twisted bunch of flowers. Again, the device is suited for use in preparing a bouquet, but not while the bouquet is in use.

The Helgeson Patent (U.S. Pat. No. 6,189,261) discloses a flexible grid for use in guiding a person to arrange flowers, and the like, including a number of openings formed therein, by woven-together fully fabric-coated, flexible wires. However, the grid limits movement of the flowers and objects of the bouquet while in use.

The Hasty Patent (U.S. Pat. No. 5,070,644) discloses a bouquet holder assembly. However, the bouquet holder assembly does not have a plurality of inner rings that can rotate about a track located along the inner periphery of an outer ring, and of which the inner rings are free to rotate while in use in supporting the flowers and other objects of the bouquet.

The Krumholz Patent (U.S. Pat. No. 1,775,203) discloses a flower support. Again, the flower support does not have a plurality of inner rings that can rotate about a track located along the inner periphery of an outer ring, and of which the inner rings are free to rotate while in use in supporting the flowers and other objects of the bouquet.

While the above-described devices fulfill their respective and particular objects and requirements, they do not describe a bouquet holding device that includes an outer ring that supports a plurality of inner rings that can rotate about the inner periphery of the outer ring, and of which enables flowers and objects of the bouquet to rotate freely during arrangement of the bouquet or while the bouquet is in use. In this regard, the bouquet holding device departs from the conventional concepts and designs of the prior art.

SUMMARY OF THE INVENTION

The bouquet holding device includes an outer ring, a plurality of inner rings, a door attached via hinge to the outer ring, a locking clasp, and a track. The track runs along the interior periphery of both the door and the outer ring, and engages a grooved notch located on each end of each inner ring. The hinged door locks in place with respect to the outer ring to ensure that the inner rings are enclosed within the track. The inner rings are capable of rotating freely about the outer ring. The inner rings are capable of securing a single or a plurality of flowers or objects associated with the bouquet.

An object of the invention is to provide a bouquet holding apparatus that enables the flowers and objects of the bouquet to rotate about an outer ring either during arrangement of the bouquet or while the bouquet is in use.

A further object of the invention is to provide a bouquet holding apparatus that can be used with either a hand bouquet or bouquet that is placed in a watering or non-watering container.

A further object of the invention is to enable the inner rings to be removed, added, or enable sideways access to the device.

A further object of the invention is to provide a bouquet holding device that is simple to use, easy to manufacture, effective, and affordable.

These together with additional objects, features and advantages of the bouquet holding device will be readily apparent to those of ordinary skill in the art upon reading the following detailed description of presently preferred, but nonetheless illustrative, embodiments of the bouquet holding device when taken in conjunction with the accompanying drawings.

In this respect, before explaining the current embodiments of the bouquet holding device in detail, it is to be understood that the bouquet holding device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bouquet holding device.

It is therefore important that the claims be regarded as including such equivalent construction insofar as they do not depart from the spirit and scope of the bouquet holding device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Detailed reference will now be made to the preferred embodiment of the present invention, examples of which are illustrated in FIGS. 1-6. A bouquet holding device 10 (hereinafter invention) includes an outer ring 11, a door 12, and a plurality of inner rings 13.

The door 12 attaches to the outer ring 11 via a hinge 12A. That being said, the outer ring 11 is not a full circle, but rather an opening to accommodate for the door 12. The door 12 also has a locking clasp 12B on an opposite end of the door 12 from the hinge 12A. The locking clasp 12B secures the door 12 in a closed position with respect to the outer ring 11, such that a ring or circle is formed.

Figure 1:
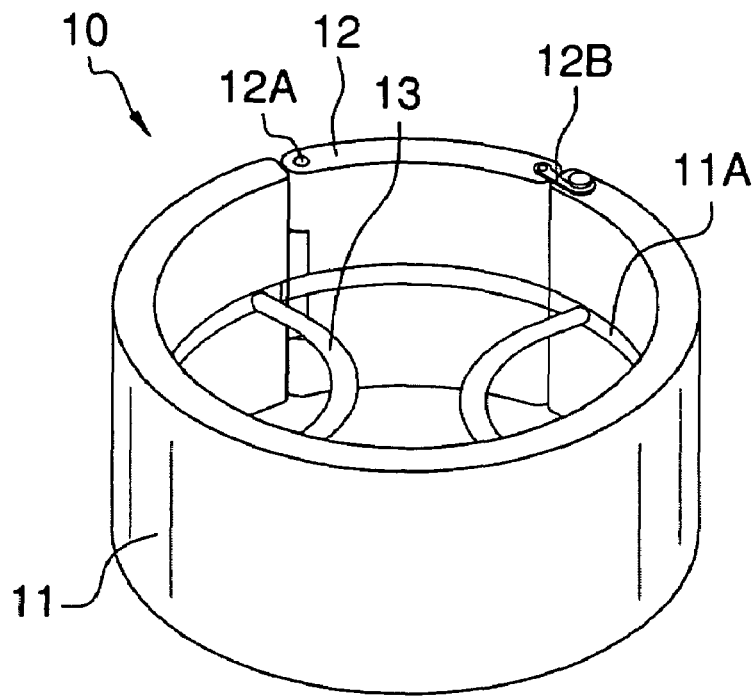
FIG. 1 illustrates a front, isometric view of the invention with the door securely closed.
Figure 2:
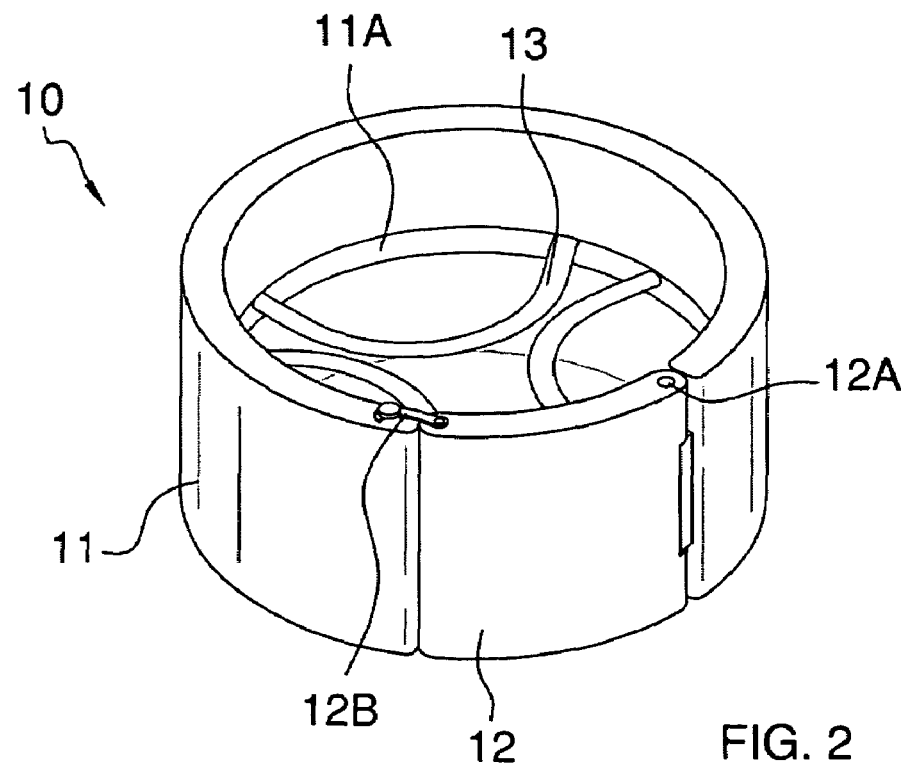
FIG. 2 illustrates a rear, isometric view of the invention with the door securely closed.
Figure 3:
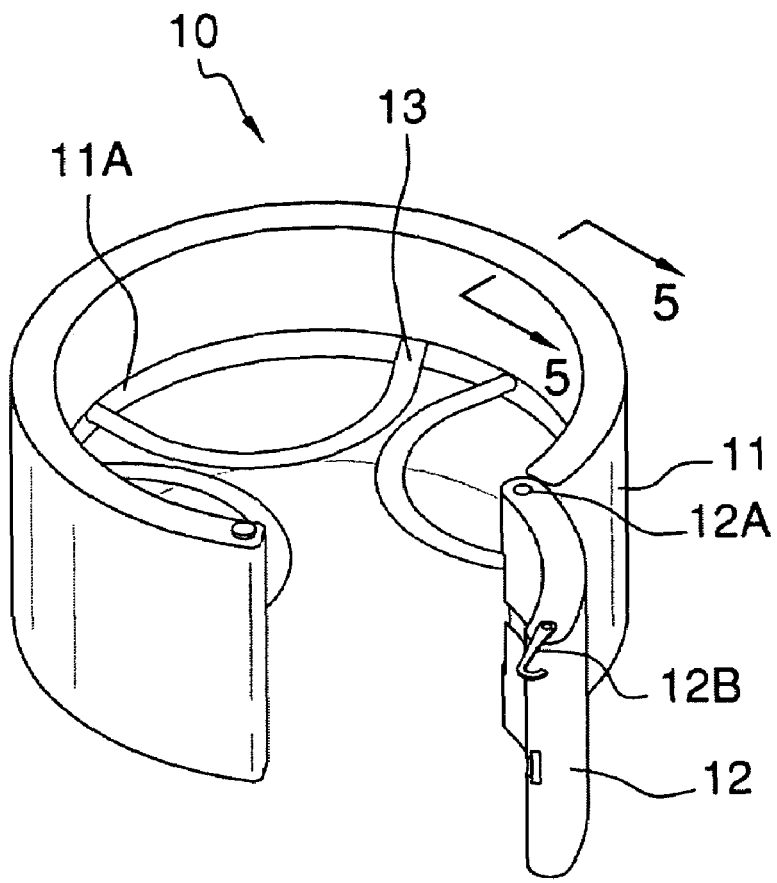
FIG. 3 illustrates a front, isometric view of the invention with the door opened.
Figure 4:
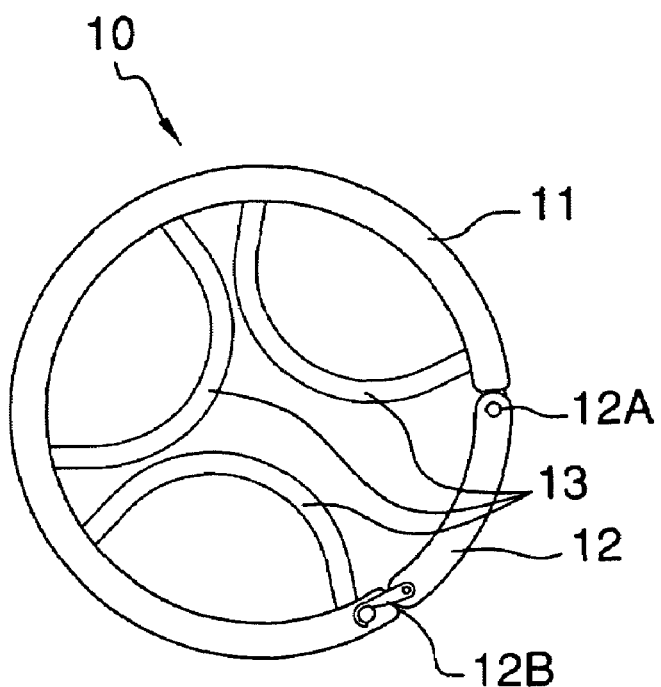
FIG. 4 illustrates a top view of the invention.
Figure 5:
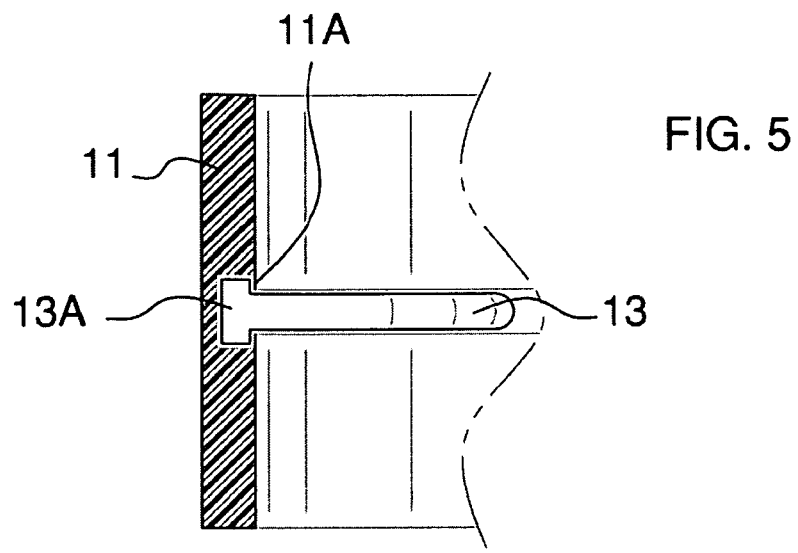
FIG. 5 illustrates a cross-sectional view of the invention along line 5-5 in FIG. 3.
Figure 6:
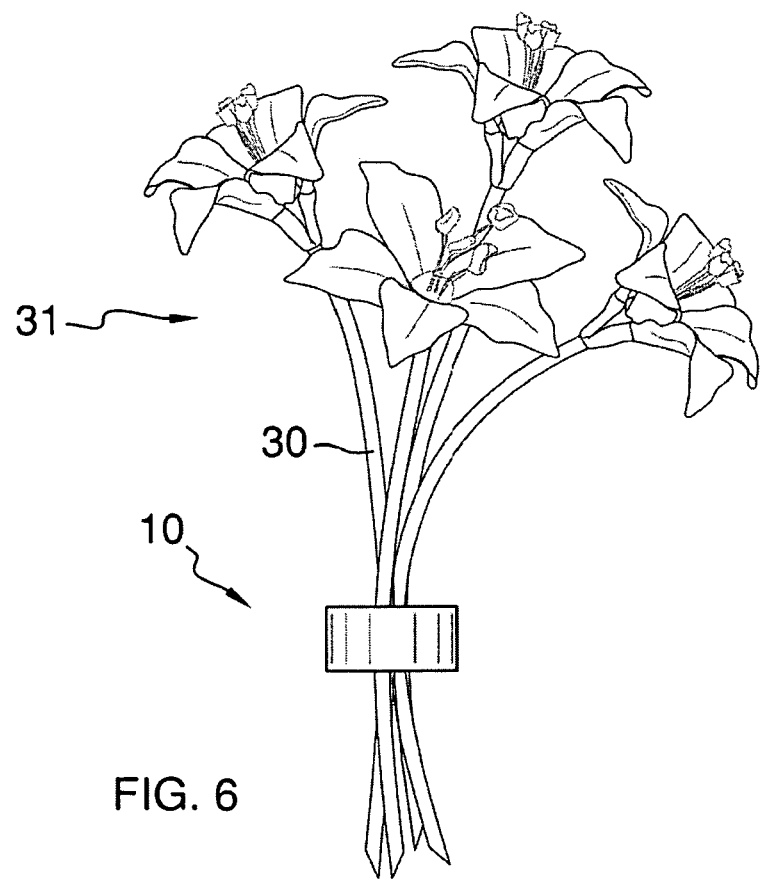
FIG. 6 illustrates the invention in use.

Located along an interior periphery of the outer ring 11 and the door 12 is a track 11A. The track 11A encircles the entire inner periphery of the outer ring 11 and the door 12. Meanwhile, the plurality of inner rings 13 have a shape generally comprised of a semi-circle or arc. Upon each end of the inner ring 13 is a grooved notch 13A. Referring to FIG. 5, the grooved notch 13A of each inner ring 13 can travel along the track 11A that is formed by the outer ring 11 and the door 12. Thus, the inner rings 13 can rotate about the center of the outer ring 11 and the door 12 via the track 11A.

Each inner ring 13 is capable of supporting at least one flower 30 or object of a bouquet 31. The purpose of the inner ring 13 is to support the flower(s) 30 during assembly of the bouquet 31 or while the bouquet 31 is in use. However, it shall be noted, that the ability to open the door 12 shall also enable the bouquet 31 to be constructed through horizontal alignment of the flower 30 in addition to inserting the flower 30 down through one of the inner rings 13.

It shall be noted that a plurality of inner rings 13 may be inserted into the track 11A. It shall be further noted that the inner rings 13 may be made of a material that is either flexible or rigid. The inner rings 13 may be made of a material comprising a plastic, metal, or wood. In the event that the inner rings 13 are made of a flexible, then a multitude of inner rings 13 may be inserted into the invention 10 and of which will occupy a smaller portion of the track 11A and thus the will create a more acute angle, and an ability to further secure the flower 30.

The outer ring 11, the door 12, the hinge 12A, and the locking clasp 12B shall be made of either a flexible or rigid material. The outer ring 11, the door 12, the hinge 12A, and the locking clasp 12B shall be made of a material comprising a wood, metal, or durable plastic.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bouquet holding device comprising:
   (a) an outer ring;
      wherein the outer ring has an opening;
   (b) a door;
      wherein the door can rotate about a first end of the opening and enclose the opening;
      wherein both the door and the outer ring have a track that encircles the inner periphery;
   (c) a plurality of inner rings;
      wherein the inner rings form an arc and have a notched groove upon each end; and
      wherein the inner rings can travel about the track and support at least a single flower or object during the arrangement of a bouquet or while the bouquet is in use.

2. The bouquet holding device as described in claim 1 wherein the door has a hinge that secures the door to the outer ring.

3. The bouquet holding device as described in claim 1 wherein the door has a locking clasp at an outer end to secure the door to the outer ring.

4. The bouquet holding device as described in claim 1 wherein the inner ring is made of a material that is flexible, and thus can expand or contract the overall distance between the notched grooves in order to occupy more or less, respectively, of the track.

5. The bouquet holding device as described in claim 4 wherein the inner ring is made of a material comprising a plastic, metal, or wood.

6. The bouquet holding device as described in claim 1 wherein the inner ring is made of a material that is rigid, and thus occupies a certain amount of space along the track.

7. The bouquet holding device as described in claim 6 wherein the inner ring is made of a material comprising a plastic, metal, or wood.

8. The bouquet holding device as described in claim 1 wherein the outer ring is made of a material comprising a plastic, metal, or wood.

* * * * *